United States Patent [19]

Dorn et al.

[11] Patent Number: 4,795,355
[45] Date of Patent: Jan. 3, 1989

[54] MOVABLE PANEL MEMBER INCORPORATING AN INTEGRATED ELECTRICAL CURRENT DISTRIBUTING BUSBAR

[75] Inventors: Uwe Dorn, Detmold; Horst Meyer, Dörentrup-Humfeld; Hans-Georg Piorek, Wiesbaden; Rudolf Miller, Feuchtwangen, all of Fed. Rep. of Germany

[73] Assignee: E C O GmbH Elektric Concept for Offices Produktion + Marketing, Wiesbaden, Fed. Rep. of Germany

[21] Appl. No.: 67,952

[22] Filed: Jun. 30, 1987

[30] Foreign Application Priority Data

Aug. 23, 1986 [DE] Fed. Rep. of Germany ....... 3628672

[51] Int. Cl.⁴ ............................................. H01R 25/14
[52] U.S. Cl. ...................................... 439/215; 174/48; 439/115
[58] Field of Search .................................. 174/48, 49; 439/110–122, 207–216

[56] References Cited

U.S. PATENT DOCUMENTS

| | | | |
|---|---|---|---|
| 3,529,274 | 9/1970 | Routh | 439/118 |
| 3,888,282 | 6/1975 | Liddall | 174/48 |
| 3,909,502 | 9/1975 | Lacan | 174/48 |
| 4,060,294 | 11/1977 | Haworth et al. | 439/215 |
| 4,685,255 | 8/1987 | Kelley | 439/209 |

FOREIGN PATENT DOCUMENTS

| | | | |
|---|---|---|---|
| 904823 | 7/1972 | Canada | 439/207 |
| 3429640 A1 | 2/1986 | Fed. Rep. of Germany | |
| 2067363 | 7/1981 | United Kingdom | 439/120 |

*Primary Examiner*—Gil Weidenfeld
*Assistant Examiner*—Gary F. Paumen
*Attorney, Agent, or Firm*—Foley & Lardner, Schwartz, Jeffery, Schwaab, Mack, Blumenthal & Evans

[57] ABSTRACT

A movable panel member incorporating an integrated electrical current distributing busbar which, for the electrification of work stations in particular, forms a screen, partition, table top, table frame, shelf, cupboard, or the like. Adapters are detachably insertable in the current distributing busbar for the supply and distribution of current. The panel member comprises at least along one edge, a channel member forming a current duct in which there is inserted a current distributing busbar, and a communication duct, separated from the current duct by means of a partition for the accommodation of communication cables. The inlet ends of both ducts are open in opposite directions on opposite sides of the panel, and they are adapted to be closed off by means of detachable covers.

22 Claims, 3 Drawing Sheets

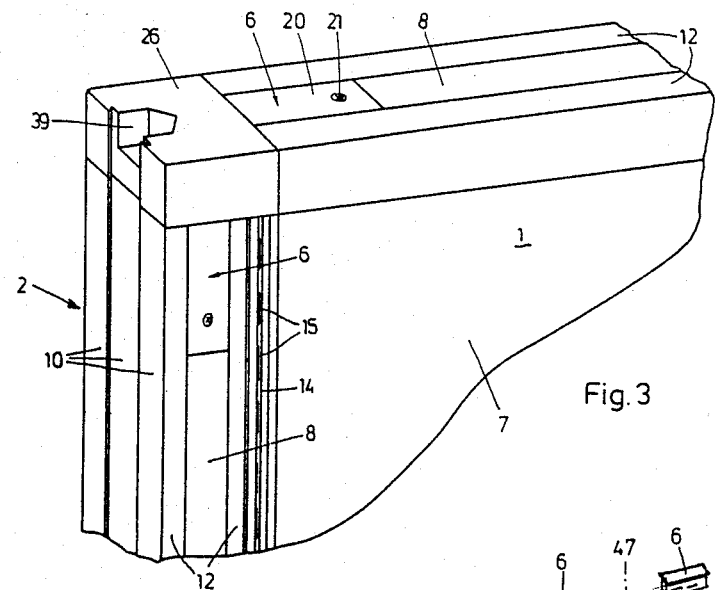
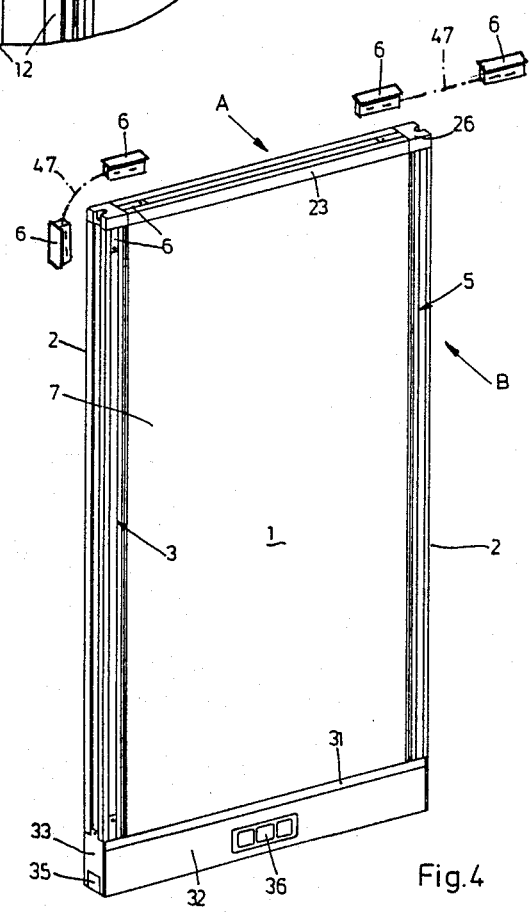

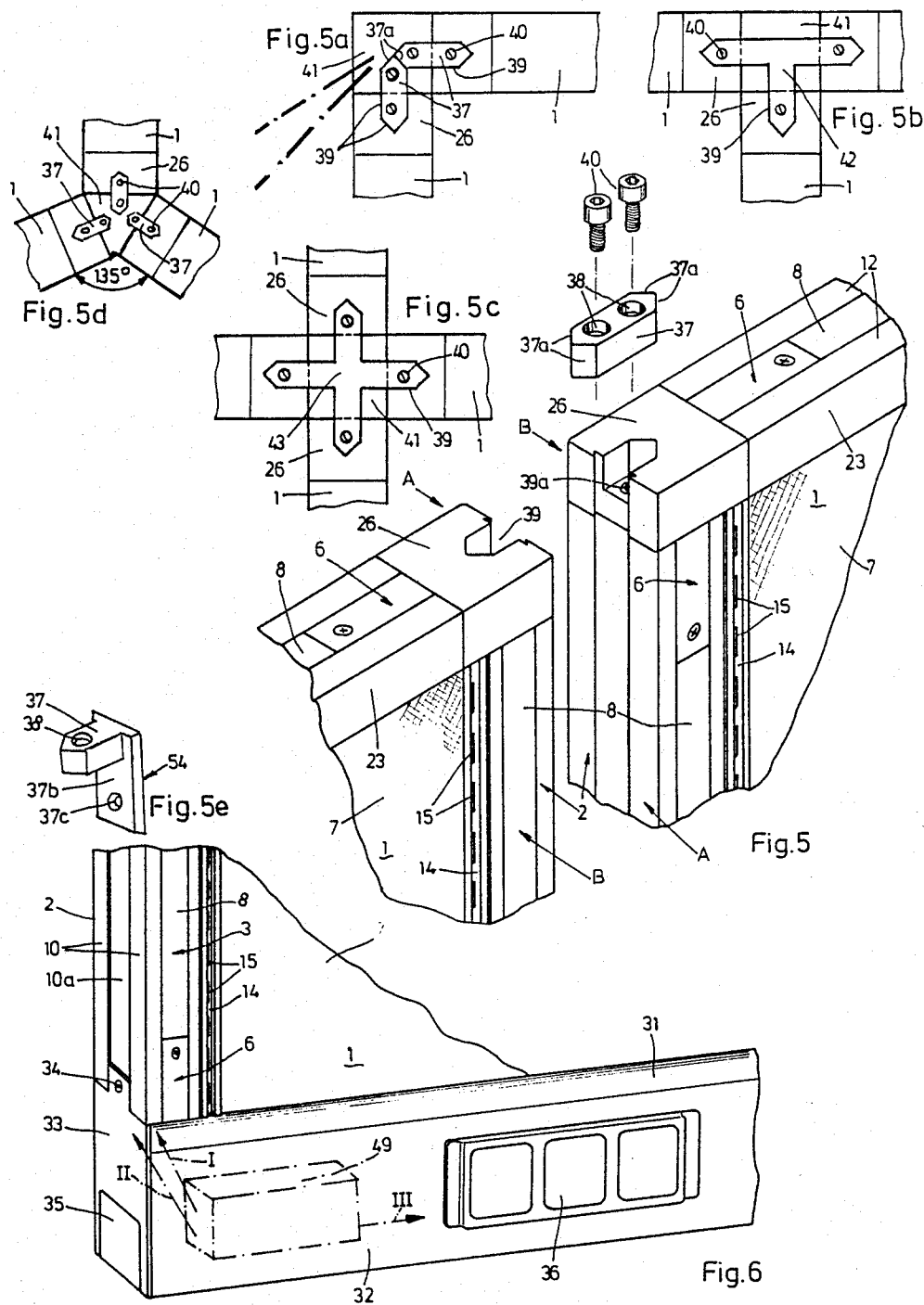

MOVABLE PANEL MEMBER INCORPORATING AN INTEGRATED ELECTRICAL CURRENT DISTRIBUTING BUSBAR

BACKGROUND OF INVENTION (a) Field of the Invention

The invention relates to a movable panel member provided with an integrated electrical current distributing busbar which, for the electrification of work stations in particular, forms a screen, partition, table top, table frame, shelf, cupboard, or the like, adapters being detachably insertable in the current distributing busbar.

(b) Description of the Prior Art

In offices, especially those which occupy large floor area, in order to be able to provide screens, partitions and desks with numerous possible electrical connections for lights, typewriters, computers, other electrical appliances, and telephone installations, it is known to arrange on the walls and desks, cable ducts which carry the wiring and also accommodate sockets and the like.

However, wiring with cable ducts is, on the one hand, relatively costly and, on the other hand, permits only a limited number of changes. This is a disadvantage when partitions and desks are to be rearranged.

In order to solve this problem, German OS No. 34 29 640 discloses a movable wall including integrated current distributing busbars. This greatly simplifies the electrification of an office and allows partitions and desks to be moved around.

Based on the movable wall according to German OS No. 34 29 640, it is the object of the present invention to provide a movable panel member which is also designed for communications devices, so that current distribution and communication connections may be arranged on both sides of a single panel member of simple design which can be located as desired and which ensures electrical safety.

SUMMARY OF INVENTION

According to the invention, there is provided a movable panel member incorporating an integrated electrical current busbar which, for the electrification of work stations in particular, forms a screen, partition, table frame, shelf, cupboard, or the like. Adapters are detachably insertable in the current distributing busbar for supply and distribution of current. The panel number comprises, at least along one edge, a channel member formed with a current duct having a current distributing busbar inserted therein, and a communication duct, which is separated from the current duct by means of a partition, for the accommodating of communication cables. The inlet ends of both ducts are open in opposite directions on opposite sides of the panel, and are capable of being closed off by means of detachable covers.

According to a preferred embodiment of the invention, a first and a second channel member is provided on each of two opposite edges of the panel member, the channel members being arranged with their ducts rotated through 180°, so that, on one side of the panel, the current duct runs along one edge while the communication duct runs along the other edge.

Each of the first and second channel members preferably has an H-shaped cross-section defining an H-web and the H-web forms a partition for the ducts which are thereby electrically shielded from one another.

In accordance with a preferred embodiment, the partition has four legs defining a U-shaped current duct and an oppositely directed U-shaped communication duct. The legs of the ducts are preferably formed with two retaining strips which are inwardly bent and are directed towards one another. Each of the covers preferably consists of a flat strip including longidutinal locking means formed on one face of the flat strip, along the longitudinal edges thereof, and means on the legs engageable with the locking means to removably lock the cover.

In accordance with another preferred embodiment of the invention each of the first and second channel members is provided on one side thereof with an attachment member, wherein there is T-shaped in cross-section and which is formed between itself and the adjacent legs an undercut groove which is square or retangular in cross-section and which is outwardly open in the same direction as the ducts.

The movable panel member may comrpise clamping blocks secured in each of the undercut grooves facing one another alongside the ducts, for attachment of furniture panels, shelves, desk tops, bench tops and cupboards to the first and second channel member, by means of screws.

The panel member preferably comprises two connecting members formed on the attachment member. The connecting members project outwardly at right angles with respect to the inlet sides of the ducts and are engaged in a groove extending around the edge of the panel member for the purpose of connecting the first and second channel members to the panel member.

In accordance with another preferred embodiment of the invention, the panel member may comprise a third channel member, extending over the entire length of an edge of the panel member between the two first channel members. The third channel member is mounted on a third edge of the panel member, and forms a current duct containing a stationary current distributing busbar.

The third channel member is preferably of C-shaped cross-section including C-legs connected together by means of a C-web, with internal partitions which are parallel to the legs of the C-shaped channel member. In conjunction with the C-web the internal partition produces a current duct which is U-shaped in cross-section. Each of the internal partitions forms with a leg of the C-shaped channel member a connecting and cable carrying duct which extends beside the current duct.

In accordance with another preferred embodiment of the invention, the edges of the legs of the C-shaped channel member are shaped to lockingly connect the cover to the third channel member.

In accordance with another preferred embodiment of the invention, there are provided two angularly projecting connecting members outside the C-web of the third channel member which engage in a preripheral groove formed along an edge of the panel member for connection with the panel member.

In accordance with another preferred embodiment of the invention, there are provided corner caps to connect the first and second channel members, respectively to the third channel member and to enable them to abut angularly, the corner cap being at least approximately positively mounted at one end of the first and second channel members and engaging by means of extensions provided in the corner cap with the third channel member.

Internal cams may be formed on the corner cap for positively engaging in the undercut grooves of the first and second channel members.

The corner cap may also be provided with extensions on one side thereof. Each extension has a retaining groove engaging with a locking bead formed in the channel of the third channel member.

According to another preferred embodiment of the invention, there is provided a cable trough and a removable cover therefor. The cable trough is secured to a fourth edge of the panel member, the cover extending over the entire fourth edge of the panel member. In addition means may be associated with the cable trough to accommodate an electrical distributing device, socket inserts, and current and communication cables. End plates may be provided with detachable plate parts.

A plurality of panel members may be aligned in straight rows, and removably connected together by means of a connecting piece defining a linear connector. The connecting piece may be in the form of an elongated block provided with triangular apices at each end and with two screw holes. The block is positively inserted into depressions formed in adjacent corner caps and is secured by means of screws engaging in the corner caps between two adjacent panel members.

Panel members abutting at right angles or at obtuse angles may be connected together by means of two linear connectors and a corner post, each of the linear connectors engaging in a corner cap and in the corner post and being detachably secured therein by means of screws.

A T-shaped or cruciform connecting piece may also be present for providing a T-shaped or cruciform connection of three or four panel members. The connecting piece engages four corner caps and in a corner post, and is detachably secured to the corner caps by means of screws.

In accordance with another preferred embodiment there may also be provided a current supply or current distribution adaptor to be mounted on the third channel member.

This adapter may consist of an elongated box like part containing electrical cable connections arranged therein and laterally emerging contacts, and at least one lateral, formed on locking strip to be mechanically secured in the current duct, the box like part being closed off by means of a cover and screws.

Panels of different heights may be aligned in a row by means of a connecting piece joining them together. The connecting piece comprises an attachment plate engaging in a groove of the channel member, and a half connecting piece, formed on the attachment plate and engaging in the cap of the lower panel element.

The movable panel member according to the invention is advantageously provided with integrated current distribution and communication facilities. Thus both functions are provided in a single panel member and, moreover, at the most appropriate locations and on both sides thereof.

According to the invention, there is provided a channel member comprising a current duct and a communication duct, the latter being shielded and electrically insulated from the current duct. The ducts may be tapped at any desired locations by inserting adapters and by connecting communication devices to the corresponding cables.

The inlet ends of both ducts may be closed off by means of shaped covers consisting of extruded members adapted to be cut to desired length in the vicinity of adapters and cable connections, thus safely and easily closing off the ducts from the outside.

An advantage of the invention is the satisfactory joining of the corners of the channel members by means of corner caps and the use of simple connecting pieces and screws for joining panel elements together which are assembled in straight lines, at an angle to each other and with T-shaped or cruciform joints. The channel member is also provided with grooves by means of which panels, shelves, or the like may be secured by means of clamping blocks, with little handling.

The panel member allows partitions, desks and work benches to be set up in a wide variety of arrangements. Individual panel members are connected together by means of electrical plug-in connections in the vicinity of their busbars. Almost all that an assembled unit needs is a main connection.

As a result of this connection of panel members without cable, they may be moved around at any time, without costly electric installation work (relaying electrical cables).

This movable panel member has a wide range of applications. A high degree of serviceability is achieved by the simplicity of the elements, their electrical safety, and the availability of the distribution points.

The panel member may be used and designed for shelves, cupboards, screens, room dividers and all movable elements.

BRIEF DESCRIPTION OF DRAWINGS

A preferred embodiment according to the invention is illustrated hereinafter in greater detail in conjunction with the drawings attached hereto, wherein:

FIG. 3 is a perspective view of the corner area according to FIG. 2, but in assembled condition;

FIG. 4 is a perspective view of a panel member with corner and linear connecting adapters;

FIG. 5 is a representation in perspective, of two panel members in linear alignment with respect to one another, with a linear connector, in disconnected condition;

FIGS. 5a to 5d show diagrammatical plan views of a corner-, T-shaped and cruciform connection of panel members;

FIG. 5e is a perspective view of a connector for panel members of different heights;

FIG. 6 is a perspective view of the lower corner area of a panel member.

Figure 1:
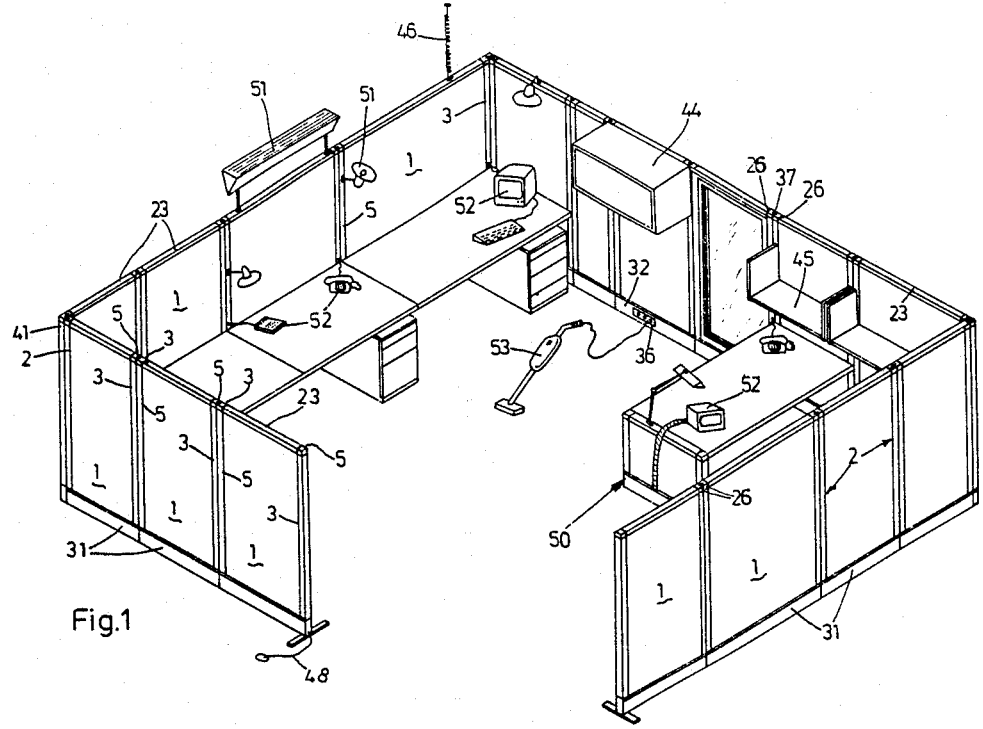
FIG. 1 is a diagrammatical representatiion, in perspective, of electrified work stations consisting of movable panel members with integrated electrical current distributing busbars and communication ducts.
Figure 2:
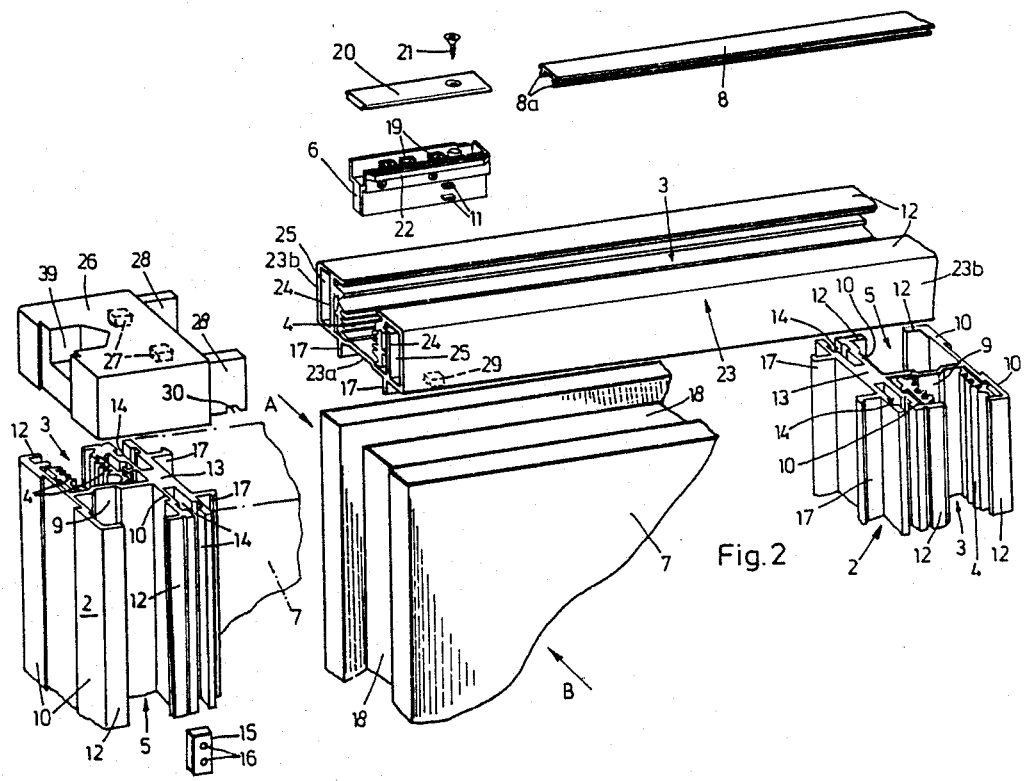
FIG. 2 is an exploded view, in perspective, of an upper corner area of a panel member, with channel members, adapters, covers, corner caps and plates.

In the drawings, there is shown a movable panel member which may be used as a table top or as the top of a desk, drawing boards, work benches or the like and also as screens and partitions for work stations in offices, residence, workshops, or the like. This panel member may also be used for table frames, cupboards, or the like.

For purposes of electrical connection, this movable panel member is provided with at least one integrated current distributing busbar 4 into which adapters 6 may be removably inserted for current supply and current distribution.

DESCRIPTION OF PREFERRED EMBODIMENTS

According to the invention, a channel member 2 made of metal, preferably a light alloy, is mounted on at least one edge of a panel 1, the channel member constituting a current duct 3 containing a current distributing busbar 4, and a communication duct 5 which is spacedly separated from the current duct. The inlet ends of these two ducts 3,5 are open in directions opposite to the direction of insertion of adapters 6 and that of the laying of the communication cables,. Ducts 3,5 are closed off by means of detachable covers 8, thus preventing inadvertent access thereof, and the channel members 2 as well as the components that they contain are designed to be electrically safe.

Stationary current distributing busbar 4, which extends in current duct 3 consists, as is well known to those skilled in the art, of a single or two piece plastic extrusion containing a plurality of electrical conductors (several current carrying phases and a neutral conductor).

According to a preferred embodiment, each of two opposite ends of the panel member 1 is provided with a channel member 2, which are mounted by rotating them 180° with respect to one another. Thus with respect to sides A,B of the panel member, the current duct 3 runs along one edge while the communication duct 5 runs along the other edge; i.e. side A has its current duct on the left and its communication duct on the right, while side B has its communication duct on the left and its current duct on the right (or vice-versa).

Each channel shaped member 2 extends over the entire length of one edge of the panel 1, and if the panel member 1 is used as a screen or a partition, then the channel shaped members 2 extend along the entire height of the panel member.

The ducts 3,5 are each of U-shaped cross-section and they are separated from one another by means of a common partition 9 forming a common U-web for the ducts. Each of the two legs 10 and partition 9 defines a U-shaped duct 3,5, thus imparting an H-shaped cross-section to the channel shaped member 2 incorporating ducts 3,5.

The single or two-piece current distributing busbar 4 is located internally against the leg 10 of current duct 3. The electrical conductors for busbar 4 are accessible from the inside, in the direction of legs 10, to current distribution contacts 11 of adapter 6. The adapter 6 is electrically connected to current distributing busbar 4 and mechanical locking, for the purpose of securing adapter 6 in current duct 3, is effected in channel shaped member 2.

The legs 10 of each duct 3,5 are formed with retaining strips 12 which are bent inwardly and are thus directed towards one another. A cover 8 consisting of a strip which is flat per se but has a locking means 8a formed on one side of the strip at the longitudinal edges thereof is detachably locked to the retaining strips 12. When the cover 8 is locked in place, it runs flush with the outer side of retaining strips 12. Cover 8, with its locking means 8a, is in the form of a metal extrusion, preferably made of a light alloy, which can be cut to any desired length. Locking means 8a may also be in the form of short locking lugs arranged along the length of the cover at a distance from one another. They may also extend over the entire length of the cover.

An attachment member 13 which is T-shaped in cross-section is formed integrally on one side of channel member 2, the attachment member forming, between itself and legs 10, an undercut groove 14 which is rectangular or square in cross-section. In this way, there is provided a groove 14 beside each duct 3,5, which groove is outwardly open in the same direction (inlet end) as the ducts 3,5.

Clamping blocks 15, having attachment holes 16 such as screw holes or the like, may be inserted in grooves 14 and may be used to secure furniture panels, shelves, desk or bench tops, or cupboards to channel members 2.

Furthermore, T-shaped attachment member 13, whose T-web runs parallel to legs 10, comprises, on the outside of the T-web, two connecting flanges 17 which are spaced from each other and which project outwardly at right angles to the access sides of ducts 3,5. These flanges are used to connect channel member 2 to panel 7. Panel 7 is preferably in the form of a multilayer panel. It is formed along its edge with a peripheral groove 18 into which connecting flanges 17 engage, to enable attachment member 13 to bear against the edge of panel 7.

Adapter 6 is in the form of an elongated box part which is T-shaped in cross-section and which comprises contacts 11 emerging from the longitudinal sides and connecting parts 19 for an electrical cable. The adapter 6 can be closed off by means of a cover 20 and screws 21 or the like. The electrical cable, not shown, may be carried through the cover 20 or through the end face of the adapter. On at least one longitudinal side, adapter 6 carries a locking strip 22 formed on its box part by means of which it is mechanically secured, in current duct 3, to channel member 2.

On one edge of the panel, preferably the upper edge thereof and running betweeen channel members 2 there is an additional channel member 23 which extends over the entire length of one edge of the panel. Channel member 23 is made of metal, preferably of a light alloy, and comprises a current duct 3 containing a stationary current distributing busbar 4. Channel member 23 is C-shaped in cross-section and comprises two internal partitions 24 formed integrally therewith and which are parallel to legs 23b. Together with the C-web 23a, they form a current duct which is U-shaped in cross-section and to which current distributing busbar 4 is secured. Furthermore, these partitions 24 form, in conjunction with legs 23b, two channels 25 which lie on each side of current duct 3 and extend over the entire length of channel member 23.

The free ends of legs 23b, are bent towards each other, to produce retaining strips 12 for engagement with cover 8.

Like channel member 2, channel member 23 is secured to panel 7 by means of connecting flanges 17 formed on C-web 23a and is engaged in groove 18 in the lateral side of panel 7.

Channel members 2, which extend in the vertical direction, accommodate, between their upper ends, horizontal channel member 23, while a corner cap 26 made of metal, preferably a light alloy, plastic, or the like, is used as the corner joint. The corner cap is placed upon the channel member 2 from above and almost positively engages the outside thereof. Internal cams 27 formed on the lateral walls, or the top of corner cap 26, are engaged in grooves 14, preferably positively and secure corner cap 26 mounted at right angles with respect to the longitudinal direction of channel member 2.

Two extensions 28 which are provided on corner cap 26, on the side facing channel member 23, can be inserted into channels 25 of the channel member 23. A locking head 29 is provided on C-web 23a, in the vicinity of each channel 25, and each extension thereof engages in a groove 30, thus locking the plug-in connection between corner cap 26 and channel member 23, and also channel member 2, in the longitudinal direction of the channel member 23.

A channel shaped cable through 31 made of metal, for example a light alloy, and comprising a detachable cover 32 made of metal, plastic, or the like, which extends over the entire length of an edge of the panel and abuts against the ends of channel member 2 is secured to the panel edge facing channel member 23, preferably the lower edge thereof.

The two end faces of cable trough 31 are closed off by means of an end plate 33 which partly bears against channel member 2 and is removably secured thereto by means of a screw 34 or the like. A removable plate 35 is provided in each end plate 33. Upon being removed, the removable plate 35 provides access to cable trough 31 for the introduction of current carrying and communications calbes. An insert 36, containing a plurality of sockets, which emerges in the vicinity of cover 32 from where it may be used, is secured in cable trough 31.

It is also desirable to divide cable trough 31, by means of a partition, into two ducts shielded from one another, one intended for current carrying cables and the other for communication cables.

A connecting piece 37 is used as a linear connector to connect togehter panel elements arranged in a straight line. This connector is in the form of an elongated block with triangular apices 37a at each end and two screw holes 38. At its end remote from extensions 28, each corner cap 26 has a recess 39 which is about half the size of the connecting piece 37. The latter is inserted into panel members 1 arranged in a straight line and is disposed in recesses 39, thus lying flush with the upper surface of the cap. Screws 40 are then placed in holes 38 of connecting piece 37 and each is screwed into a threaded hole 38a of a corner cap 26. Connecting piece 37 thus bridges the joint between the two panel elements, thereby removably connecting them together.

FIG. 5a shows two panel members connected together at right angles, using two connecting pieces 37 and a corner post 41 in the corner area to fill in the free space between panel members 1. The connecting pieces meet at right angle at their apices 37a. Screws 38 are screwed, on the one hand into corner caps 26 and, on the other hand into corner posts 41.

By varying the configuration of triangular apices 37a of connecting pieces 37 it is possible to join together panel members which are at an angle of 45° or 30° with respect to one another, as indicated in broken lines in FIG. 5a.

FIG. 5b shows three panel members joined together by means of a T-shaped connection. There are also provided a corner post 41 and a T-shaped connecting piece 42. Three screws 40 engage in corner caps 26.

FIG. 5c shows a cruciform connection with corner posts 41 and a cruciform connecting piece 42. Screws 38 provided in the four arms are screwed into corresponding corner caps 26.

FIG. 5d shows a star connection for three panel members, the adjacent panel members being at an angle of 135° with respect to one another. Connecting pieces 37 do not meet in corner post 41 but engage therewith at a distance from one another.

This arrangement may also be used for the angular, T-shaped and cruciform joints according to FIGS. 5a to 5c, using two, three or four connectors 37. This eliminates the need for connectors 42 and 43. Connectors 37 engage in corner posts 41 at a distance from one another and only one type of connector is needed for all types of joint.

The corner posts 41 are provided with recesses to receive the areas of the connectors corresponding to caps 26 and the shape of connectors 37,42,43.

The linear, angular, T-shaped or cruciform joint between panel members 1, in the vicinity of cable trough 31, may also be carried out with connectors 37,42,43 or by other suitable screws and connecting parts.

FIG. 5e shows a connector 54 for panel members of different heights which are to be joined together along a straight line. This connector comprises a half connecting piece 37 with a hole for an attachment screw 40, the half connecting piece projecting at right angles from an attachment plate 37b. Attachment plate 37b of the connector is inserted into groove 10a, formed by legs 10, of higher panel member 1 in such a manner that the half connector 37 can engage at the top in cap 26 of shorter panel member 1 and can be secured therein. Attachment plate 37b is secured in groove 10a of panel member 2, by means of a screw extending through hole 37c.

FIG. 1 of the drawing shows panel members 1 according to the invention when in use. The elements are set up and joined together in the form of screens and desk tops for work stations; they are assembled linearly or at an angle with respect to one another, and are used either in the upright position or horizontally.

The linear and angular connections between the panel elements are carried out, as described hereinbefore, by means of connectors 37, while horizontally arranged panel members are secured in grooves 14 of upright channel members 2, by means of clamping blocks 15. Cupboards (containers) 14, shelves 45, planks or the like may also be secured to upright channel members 2 by means of clamping blocks 15.

FIG. 1 also shows the arrangement of current ducts and communications ducts on alternate sides. This makes it possible to use a current duct 3 and a communication duct 5 on each side A,B of each panel element 1.

The current for this work area may be supplied from above through a ceiling line 46 which is connected to a supply adapter 6 inserted at any desired location into a current distribution busbar 4 located in upper channel member 23. The electrical connection between adjacent panel members, joined together linearly or at an angle with respect to one another, is then also carried out, in the joint areas, by means of two connecting adapters 6 connected together by means of a flexible electrical conductor 47, as shown in FIG. 4, one adapter 6 being inserted into each panel member and conductor 47 then connecting adjacent panel members together in the vicinity of current ducts 3. The current may also be supplied in the socket area of a panel member 1 which then represents an initial element. The electrical supply line 48 is introduced, through end plate 33 (plate part 35 having been removed), into cable through 31 and is connected to a distributor 49, the supply being of the multiphase type. The light current I phase and the second socket current II phase pass from distributor 49 to a supply adapter 6 in a current duct 3, while the third socket current III phase in the socket area (cable trough 31) passes to socket insert 36 and to the other panel element in the socket area (see FIGS. 1 and 6).

All of the panel members constituting a work area are then electrically connected together through supply adapter 6 in the initial panel member 1 and through connecting adapters 6 in the corner areas. The same applies, of course, to the supply of current from above through ceiling line 46 or to a supply provided in a table frame foot or socket, as indicated in FIG. 1 by reference numeral 50.

The communication cables are also brought in at one of the above mentioned locations. They then run, in cable trough, or cable troughs 322, in individual ducts 5, upwardly and horizontally, to the relevant distribution points. In the corner areas, especially in the upper corner areas, channel members 2,23, and corner caps 26, are provided with appropriate lead through recesses. Corner caps 26 are provided with hollow extensions 28, or with grooves in the extensions, while in upper channel members 23 communication cables are laid in channels 25.

As shown in FIG. 1, lighting fixtures 51, provided with adapters 6, may be connected at any desired location in vertical and horizontal current ducts 3. Covers 8 must, however, be suitably recessed, i.e. a piece equal in length to adapter 6 must be cut off at each location in order to provide room for the adapter, after which the current duct must be closed off smoothly.

Supply adapters are visible in many locations in the drawings, with covers 8 connected directly thereto.

FIG. 1 also shows various appliances 52, such as display screens, computers, calculators, telephones, or the like connected to communication cables at various locations in communication ducts 5. For this purpose openings are made in communication duct covers 8.

It is possible to removably secure lighting fixtures 51 in a current duct 3 and in a communication duct 5, by means of two adapters 6. In this case, the current is taken from current duct 3 only, the second adapter being merely a dummy which is secured mechanically in communication duct 5.

Various other appliances, such as vacuum cleaners, fans, heaters, or the like may be connected to socket inserts 36.

We claim:

1. A movable panel member with an integrated electrical current busbar which, for the electrification of work stations in particular, forms a screen, partition, table top, table frame, shelf, or cupboard, adapters being detachably insertable into said current distributing busbar for supply and distribution of current, wherein said panel member comprises, at least at one edge, a channel member formed with a current duct having said current distributing busbar inserted therein, and a communication duct, which is separated from said current duct by means of a partition, for the accommodation of communication cables, inlet ends of both said ducts being open in opposite directions on opposite sides of the panel, and capable of being closed off by means of detachable covers.

2. A movable panel member according to claim 1, wherein a first and a second channel member is provided on each of two opposites edges of the panel member, said first and second channel members being arranged with said ducts rotated through 180°, so that, on one side of the panel, the current duct runs along one edge while the communication duct runs along the other edge.

3. A movable panel member according to claim 2, wherein each said first and second channel members has an H-shaped cross-section defining an H-web and the H-web forms the partition for the ducts which are thereby electrically shielded from one another.

4. A movable panel member according to claim 3, wherein said partition has four legs defining a U-shaped current duct and an oppositely directed U-shaped communication duct.

5. A movable panel member according to claim 4, wherein said legs of said ducts are formed with two retaining strips which are inwardly bent and are directed towards one another, each of said covers consisting of a flat strip including longitudinal locking means formed on one face of said flat strip, along longitudinal edges thereof, and means on said legs engageable with said locking means to removably lock said cover thereto.

6. A movable panel member according to claim 5, wherein each of said first and second channel members is provided on one side thereof with an attachment member, which is T-shaped in cross-section and wherein there is formed between said attachment member and the adjacent legs an undercut groove which is square or rectangular in cross-section and which is outwardly open in the same direction as the ducts.

7. A movable panel member according to claim 6, which comprises clamping blocks secured in each said undercut groove facing one another alongside said ducts, for attachment of furniture panels, shelves, desk tops, bench tops and cupboards to the first and second channel members, by means of screws.

8. A movable panel member according to claim 7, which comprises two connecting members formed on said attachment member, said connecting members projecting outwardly at right angles with respect to the inlet ends of the ducts and engaging in a groove extending around the edge of said panel member for the purpose of connecting the first and second channel members to the panel member.

9. A movable panel member according to claim 8, which comprises a third channel member, extending over the entire length of an edge of the panel member between the two first channel members, said third channel member being mounted on a third edge of the panel member, said third channel member forming a current duct containing a stationary current distributing busbar.

10. A movable panel member according to claim 9, wherein said third channel member is of C-shaped cross-section including C-legs connected together by means of a C-web, said third channel member being provided with two internal partitions which are parallel to the C-legs of the C-shaped third channel member, said internal partitions in conjunction with the C-web, producing a current duct which is U-shaped in cross-section, each of the said internal partitions forming with a C-leg of the C-shaped third channel member, a connecting and cable carrying duct which extends beside the current duct.

11. A movable panel member according to claim 10, wherein the edges of the legs of the C-shaped third channel member are shaped to form retaining strips for lockingly connecting a cover to the third channel member.

12. A movable panel member according to claim 10, which comprises two angularly projecting connecting members formed outside the C-web of the third channel member, said connecting members engaging in peripheral groove formed along an edge of said panel member for connection with said panel member.

13. A movable panel member according to claim 9, which comprises corner caps to connect said first and second channel members, respectively to said third channel member and to enable them to abut angularly, said corner caps being mounted at one end of the first and second channel members, respectively and engaging by means of extensions in said corner gap with the third channel member.

14. A movable panel member according to claim 13, wherein internal cams are formed on each said corner cap, said cams engaging positively in the undercut grooves of the first and second channel members.

15. A movable panel member according to claim 13, wherein each said corner cap is provided with said extensions on one side thereof, each extension having a retaining groove engaging with a locking bead formed in the third channel member.

16. A movable panel member according to claim 1, which comprises a cable trough and a removable cover therefor, said cable trough being secured to a fourth edge of the panel member, said cover extending over the entire fourth edge of the panel member.

17. A movable panel member according to claim 16, which comprises means associated with the cable trough to accommodate an electrical distributing device, socket inserts, and current and communication cables.

18. A movable panel member according to claim 16, which comprises end plates provided with detachable plate parts to close the ends of the cable trough.

19. A movable panel member according to claim 1, which comprises a plurality of panel members aligned in straight rows, and removably connected together by means of a connecting piece defining a linear connector, said connecting piece being in the form of an elongated block provided with triangular apices at each end and with two screw holes; said block being positively inserted into depressions formed in adjacent corner caps and being secured by means of screws engaging in said corner caps between two adjacent panel members.

20. A movable panel member according to claim 1, wherein panel members, abutting at right angles or at obtuse angles, are connected together by means of two linear connectors and a corner post, each of the linear connectors engaging in a corner cap and in said corner post and being detachably secured therein by means of screws.

21. A movable panel member according to claim 1, which comprises a T-shaped or cruciform connecting piece for providing a T-shaped or cruciform connection of three or four panel members, said connecting piece engaging four corner caps and a corner post, and being detachably secured to the corner caps by means of screws.

22. A movable panel member according to claim 1, which comprises a current supply or current distribution adapter to be mounted on said third channel member, said adapter consisting of an elongated box like part containing electrical cable connections arranged therein and laterally emerging contacts, and at least one lateral, formed on locking strip for securing mechanically in the current duct, said box like part being closed off by means of a cover and screws.

* * * * *